United States Patent
Georgescu et al.

(10) Patent No.: US 11,679,868 B1
(45) Date of Patent: Jun. 20, 2023

(54) PORTABLE AUTOPILOT

(71) Applicants: Radu A Georgescu, Louisville, KY (US); Adrian Hojda, Sierra Madre, CA (US)

(72) Inventors: Radu A Georgescu, Louisville, KY (US); Adrian Hojda, Sierra Madre, CA (US)

( * ) Notice: Subject to any disclaimer, the term of this patent is extended or adjusted under 35 U.S.C. 154(b) by 0 days.

(21) Appl. No.: 17/689,967

(22) Filed: Mar. 8, 2022

Related U.S. Application Data

(60) Provisional application No. 63/176,257, filed on Apr. 17, 2021.

(51) Int. Cl.
| | | |
|---|---|---|
| *B64C 13/16* | (2006.01) | |
| *B64C 13/20* | (2006.01) | |
| *B64C 13/18* | (2006.01) | |

(52) U.S. Cl.
CPC .............. *B64C 13/20* (2013.01); *B64C 13/16* (2013.01); *B64C 13/18* (2013.01)

(58) Field of Classification Search
CPC .......... B64C 13/16; B64C 13/18; B64C 13/20
See application file for complete search history.

(56) References Cited

U.S. PATENT DOCUMENTS

| | | | |
|---|---|---|---|
| 10,246,178 B2 | 4/2019 | Elliott et al. | |
| 10,577,082 B2 | 3/2020 | Baran et al. | |
| 10,589,845 B2 * | 3/2020 | Sheffer | B64C 13/22 |
| 11,104,421 B2 * | 8/2021 | Sheffer | B64C 9/02 |
| 2021/0276696 A1 * | 9/2021 | Leon | B64C 5/08 |

* cited by examiner

*Primary Examiner* — Richard G Davis
(74) *Attorney, Agent, or Firm* — QuickPatents, LLC; Kevin Prince

(57) ABSTRACT

An autopilot device for attaching to and exerting forces upon a control wheel of an aircraft includes an actuator fixed with a base, the actuator adapted to move a weight between a left-most position, a center position, and a right-most position. When the weight is in the center position, the base has a center-of-gravity vertically aligned with the rotational axis of the control wheel. When the weight is left or right of the center position, the weight causes a left or right rotational moment on the control wheel, respectively. A controller is connected with the actuator and a power source and is adapted to detect flight parameters including an aircraft orientation, an aircraft heading, and a desired flight path. The controller applies power from the power source to the actuator to move the actuator and weight, thereby causing the aircraft to intercept and track the desired flight path.

13 Claims, 3 Drawing Sheets

PORTABLE AUTOPILOT

CROSS-REFERENCE TO RELATED APPLICATIONS

This application claims the benefit of U.S. Provisional Patent Application 63/176,257, filed on Apr. 17, 2021, and is incorporated herein by reference.

STATEMENT REGARDING FEDERALLY SPONSORED RESEARCH AND DEVELOPMENT

Not Applicable.

FIELD OF THE INVENTION

This invention relates to aircraft, and more particularly to a portable autopilot system.

BACKGROUND

For existing aircraft that do not have autopilot systems installed, the cost of upgrading the aircraft by installing an autopilot can be prohibitive. Therefore, there is a need for a low-cost alternative to traditional autopilot systems that typically require extensive installation and FAA certification (such as U.S. Pat. No. 10,246,178 to Elliott et al. on Apr. 2, 2019). Such a needed device would avoid several problems found in other prior art patents related to portable autopilot systems, such as having excessive moving parts and being difficult to mount and remove from the aircraft (as with U.S. Pat. No. 10,589,845 to Sheffer et al. on Mar. 17, 2020).

Such a needed device would further not require the removal of existing cockpit components, as is the case with the device disclosed in U.S. Pat. No. 10,577,082 to Baran et al. on Mar. 3, 2020.

Further, the needed invention would allow for a pilot to quickly and easily override the device, and would further allow for the full range-of-motion of the aircraft control wheel. The present invention accomplishes these objectives.

SUMMARY OF THE INVENTION

The present invention is an autopilot device for moving a control wheel of an aircraft. The control wheel is of the type having a rotational axis and a neutral position. The autopilot device includes a base adapted for temporary attachment to the control wheel of the aircraft, preferably with a plurality of mechanical fasteners such as hook-and-loop fastening strips, two-sided adhesive tape, resilient C-shaped clips, or the like.

An actuator is fixed with the base and is adapted to move a weight between a left-most position, a center position, and a right-most position. When the weight is in the center position, the base has a center-of-gravity vertically aligned with the neutral position of the control wheel of the aircraft. When the weight is left of the center position, the base has a center-of-gravity that imparts a leftward rotational moment to the control wheel of the aircraft. When the weight is right of the center position, the base has a center-of-gravity that imparts a rightward rotational moment to the control wheel of the aircraft.

A controller is connected with the actuator and a power source. The controller is adapted to detect flight parameters including an aircraft orientation, an aircraft heading, and a desired flight path. The controller applies power from the power source to the actuator, causing it to move the weight, thereby causing the aircraft to bank in the direction of the weight movement. Due to flight dynamics, this bank angle will cause the plane to progressively turn into the direction of the bank. When the aircraft is about to intercept the desired flight path, an opposing movement of the weight is ordered by the controller, causing the aircraft to return to zero bank angle, which in turn causes the aircraft to maintain straight flight. This maneuvers can be automatically repeated as per an algorithm programmed inside the CPU that will cause the aircraft to follow the prescribed flight path, and to reject perturbations caused by wind gusts or other unforeseen factors.

The controller includes a temporary attachment mechanism adapted for attaching the controller with an instrument panel of the aircraft. Such a temporary attachment mechanism may include hook-and-loop type fastener material, two-sided adhesive tape, mechanical snaps, or the like.

In some embodiments the controller is connected with the actuator through a plurality of flexible electric cables. In alternate embodiments, the controller is connected with the actuator through a wireless protocol, wherein the controller and the actuator both include radio transceivers, and wherein the actuator includes a second power source, such as a battery.

In some embodiments, the base includes an elongated frame, and the actuator is a linear actuator aligned within the elongated frame. A selectively removable cover may be included for covering and protecting the weight within the elongated frame. The linear actuator is adapted to move the weight between the left-most position and the right-most position based on commands from the controller.

In alternate embodiments the actuator is a motor, preferably a stepper motor. The weight is fixed at a distal end of a rotational arm. A proximal end of the rotational arm is fixed with the motor. As such, the motor moves the rotational arm, and thereby the weight, between the left-most position and the right-most position.

The present invention provides a low-cost alternative to traditional autopilot systems that require extensive installation and FAA certification. The present device is comparatively simple, with fewer moving parts, and is easier to mount and remove from the aircraft.

Our device does not require a prior set-up step involving intermediary clamps, and is not required to be attached to a fixed anchor point on the instrument panel or other components of the aircraft frame. The present invention does not require the removal of existing cockpit components, and can be quickly overridden by the pilot by applying a force slightly larger than usual on the aircraft control wheel. The present device allows the full range of motion of the aircraft control wheel, and does not require tools for installation, being a temporary accessory to the aircraft (not permanently installed). Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
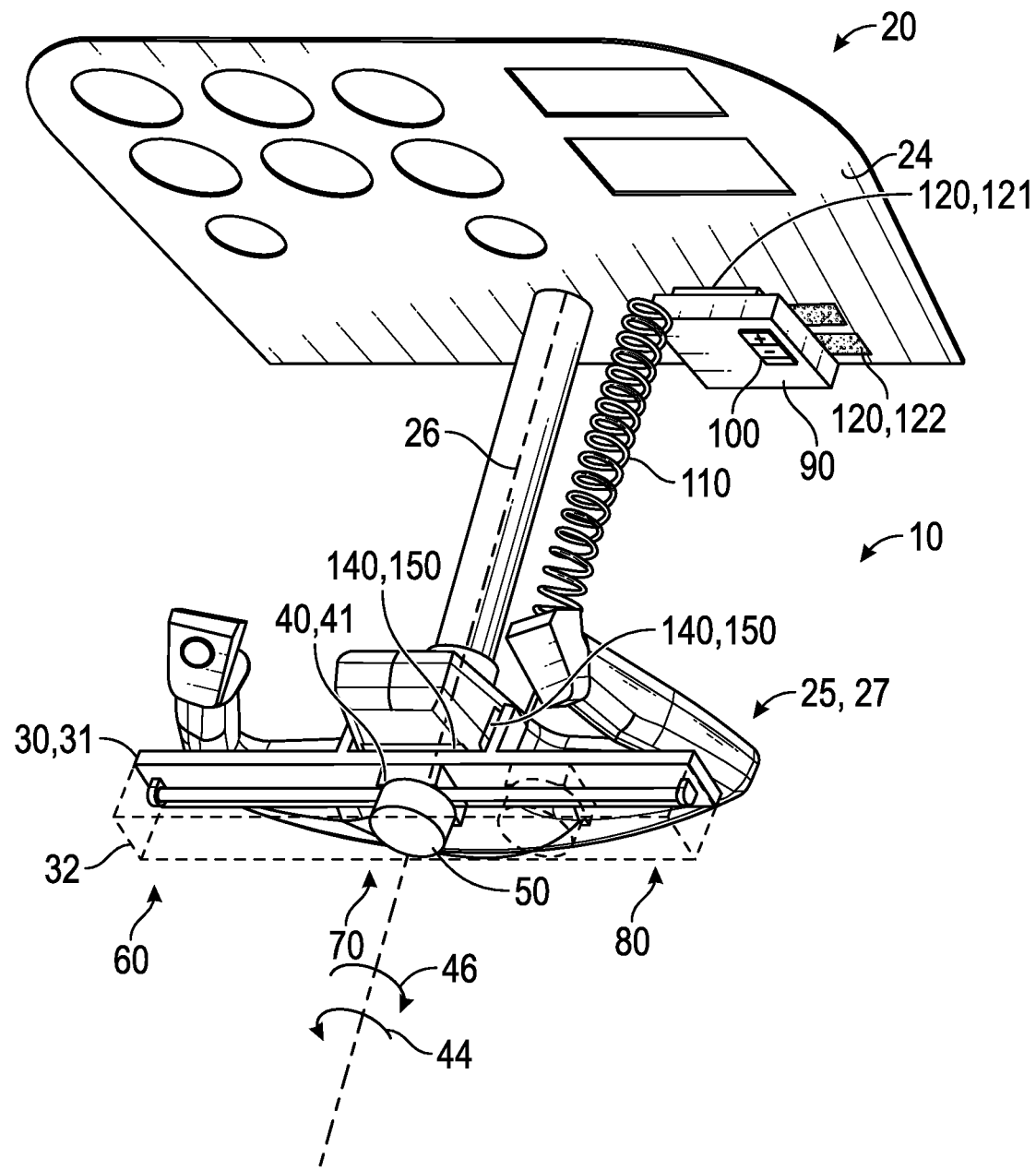
FIG. 1 is a perspective view of a first embodiment of the invention, illustrated as mounted to an aircraft control wheel.

FIG. 1 illustrates an autopilot device 10 for moving a control wheel 25 of an aircraft 20. The control wheel 25 is of the type having a rotational axis 26, and a neutral position 27 wherein the aircraft flies straight ahead. The control wheel 25 also has a longitudinal translation axis, forward to rearward, but the autopilot device 10 is designed not to act upon the longitudinal translation axis of movement.

Figure 2:
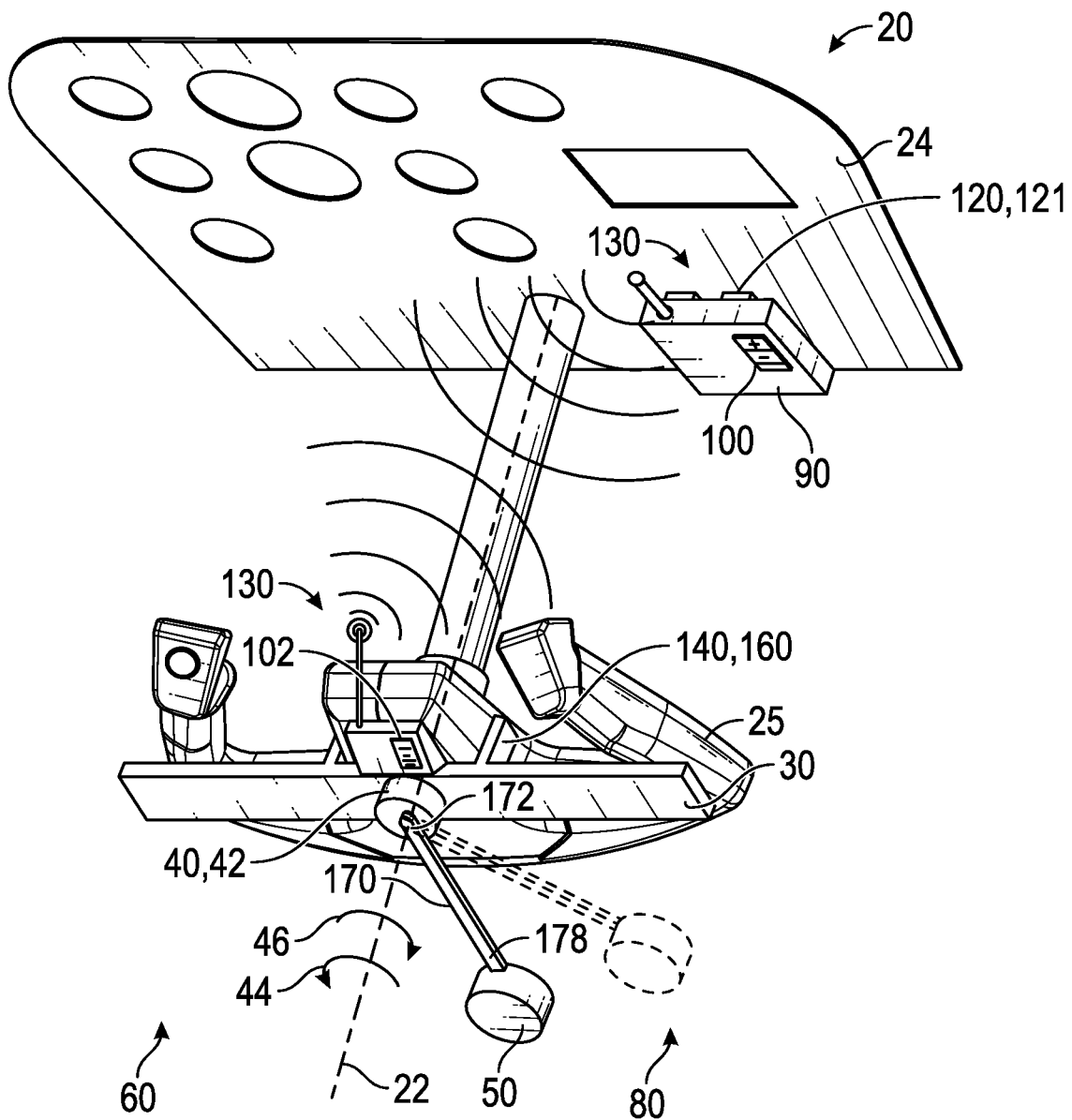
FIG. 2 is a perspective view of a second embodiment of the invention, also used on an aircraft with the control wheel.

The autopilot device 10 includes a base 30 adapted for temporary attachment to the control wheel 25 of the aircraft, preferably with a plurality of mechanical fasteners 140 such as hook-and-loop fastening strips 150 (FIG. 1), resilient C-shaped clips 160 (FIG. 2), two-sided adhesive tape (not shown), mechanical slide clips (not shown), or the like, provided that such mechanical fasteners 140 do not requires tools for installation, such as bolts, rivets, adhesives, welding, or the like, which would require separate and expensive certification of the device by the FAA).

An actuator 40 is fixed with the base 30 and is adapted to move a weight 50 between a left-most position 60, a center position 70, and a right-most position 80. When the weight 50 is in the center position 70, the base 30 has a center-of-gravity vertically aligned with the rotational axis 26 of the control wheel 25 of the aircraft 20, which maintains the aircraft 20 flying straight ahead. When the weight 50 is left of the center position 70, the base 30 has a center-of-gravity that imparts a leftward rotational moment to the control wheel 25 of the aircraft 20. When the weight 50 is right of the center position 70, the base 30 has a center-of-gravity that imparts a rightward rotational moment 46 to the control wheel 25 of the aircraft 20. The weight 50 is shown moving towards the right-most position 80 in FIG. 1 in broken lines, and in the center position 70 in solid lines.

A controller 90 is connected with the actuator 40 and a power source 100 (FIG. 3), such as a battery, a DC cigarette lighter connection, or the like. The controller 90 includes at least a CPU 210, and preferably also a user interface 240, a communication module 135 that preferably includes a radio transceiver 130, a memory 220, and a display 200. The controller 90 is adapted to detect flight parameters including an aircraft orientation and heading through an AHRS system 180, an aircraft heading, possibly through a GPS module 190, and a desired flight path stored in the memory 220 of the controller 90. The controller 90 applies power from the power source 100 to the actuator 40 to move the actuator 40 and weight 50, thereby causing the aircraft 20 to bank in the direction of the weight movement. Due to flight dynamics, this bank angle will cause the aircraft 20 to progressively turn into the direction of the bank. When the aircraft 20 is about to intercept the desired flight path, an opposing movement of the weight 50 is ordered by the controller 90, causing the aircraft 20 to return to a zero bank angle, which in turn causes the aircraft 20 to maintain straight flight. These maneuvers can be automatically repeated as per an algorithm programmed in the controller 90 that will cause the aircraft to follow the prescribed flight path, and to reject perturbations caused by wind gusts or other unforeseen factors.

The AHRS system 180 of the controller 90 may further include a gyroscope module 250 and an accelerometer module 260, both for allowing the controller 90 to determine flight parameters independently of instrumentation of the aircraft 20.

The controller 90 includes a temporary attachment mechanism 120 adapted for attaching the controller 90 with an instrument panel 24 of the aircraft 20, or at some other location on the aircraft 20. Such a temporary attachment mechanism 120 may include hook-and-loop type fastener material 122, mechanical snaps (not shown), two-sided adhesive tape 121, or the like.

Figure 3:
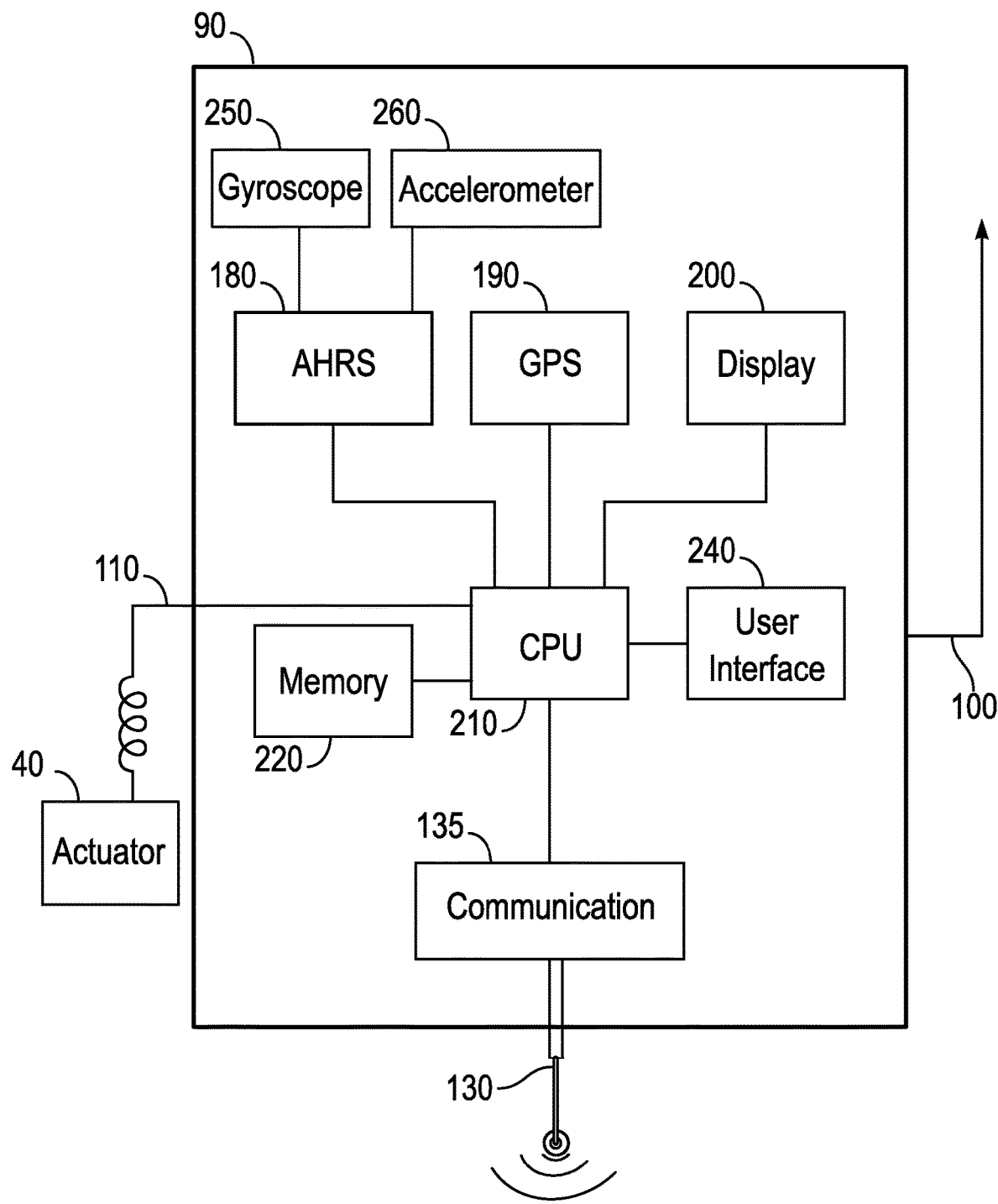
FIG. 3 is a diagram of a controller of the invention.

In some embodiments the controller 90 is connected with the actuator 40 through a plurality of flexible electric cables 110 (FIGS. 1 and 3). In alternate embodiments, the controller 90 is connected with the actuator 40 through a wireless protocol, wherein the controller 90 and the actuator 40 both include one of the radio transceivers 130 (FIG. 2), and wherein the actuator 40 includes a second power source 102, such as a battery.

In some embodiments, the base 30 includes an elongated frame 31 (FIG. 1), and the actuator 40 is a linear actuator 41 aligned within the elongated frame 31. A selectively removable cover 32 may be included for covering the weight 50 within the elongated frame 31. The linear actuator 41 is adapted to move the weight between the left-most position 60 and the right-most position 80 based on commands from the controller 90.

In alternate embodiments, the actuator is a motor 42 (FIG. 2), preferably a stepper motor 42. The weight 50 is fixed at a distal end 178 of a rotational arm 170. A proximal end 172 of the rotational arm 170 is fixed with the motor 42. As such, the motor 42 moves the rotational arm 170, and thereby the weight 50, between the left-most position 60 and the right-most position 80. Rotating the rotational arm 170 counter-clockwise (towards the right-most position 80) causes the weight 50 to move to the right of the rotational axis 26 of the control wheel 25, causing an opposite torque to be exerted via the motor 42 and the base 30 to the control wheel 25, which in turn causes the control wheel 25 to turn clockwise, causing the aircraft 20 to bank towards the right.

The proximal end 172 of the rotational arm 170 is connected with either a drive shaft (not shown) of the motor 42, or an output shaft (not shown) of a gear box (not shown)

that further increases the resolution of the movement of the weight 50 with respect to rotation of the motor 42.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An autopilot device for exerting input forces upon a control wheel of an aircraft, the control wheel having a rotational axis and a neutral position, the autopilot device comprising:
   a base adapted for temporary attachment to the control wheel of the aircraft;
   an actuator fixed with the base and adapted to move a weight between a left-most position, a center position, and a right-most position, wherein when the weight is in the center position, the base having a center-of-gravity vertically aligned with the rotational axis of the control wheel of the aircraft, and wherein when the weight is left of the center position a rotational moment to the left is applied to the control wheel, and wherein when the weight is right of the center position a rotational moment to the right is applied to the control wheel;
   a controller connected with the actuator and a power source, the controller adapted to detect flight parameters including an aircraft orientation, an aircraft heading, and a desired flight path, and to apply power from the power source to the actuator to move the actuator and weight, thereby causing the aircraft to bank in order to maintain the desired flight path.

2. The autopilot device of claim 1 wherein the controller is connected with the actuator through a plurality of flexible electric cables, and wherein the controller includes a temporary attachment mechanism adapted for attachment with an aircraft instrument panel.

3. The autopilot device of claim 2 wherein the temporary attachment mechanism includes a hook-and-loop type fastener material.

4. The autopilot device of claim 2 wherein the temporary attachment mechanism includes two-sided adhesive tape.

5. The autopilot device of claim 1 wherein the controller is connected with the actuator through a wireless protocol, the controller and the actuator both including radio transceivers, the actuator including a second power source.

6. The autopilot device of claim 1 wherein the base is temporarily attached to the control wheel with a plurality of mechanical fasteners.

7. The autopilot device of claim 6 wherein the mechanical fasteners include hook-and-loop fastening strips.

8. The autopilot device of claim 6 wherein the mechanical fasteners include resilient C-shaped clips.

9. The autopilot device of claim 1 wherein the base is an elongated frame and wherein the actuator is a linear actuator aligned within the elongated frame.

10. The autopilot device of claim 1 wherein the actuator is a motor, and wherein the weight is fixed at a distal end of a rotational arm, a proximal end of the rotational arm fixed with the motor.

11. The autopilot device of claim 10 wherein the motor is a stepper motor.

12. The autopilot device of claim 1 wherein the controller detects the flight parameters through a flight parameter interface of the aircraft.

13. The autopilot device of claim 1 wherein the controller further includes one or more flight parameter sensing modules taken from the group consisting of: an AHRS module, a GPS module, a gyroscope module, and an accelerometer module, whereby the autopilot device can discern flight parameters independently of the aircraft.

\* \* \* \* \*